(12) United States Patent
Bartoy et al.

(10) Patent No.: US 9,087,311 B2
(45) Date of Patent: Jul. 21, 2015

(54) METHOD, SYSTEM AND PROGRAM PRODUCT FOR GROUPING RELATED PROGRAM SEQUENCES

(75) Inventors: Martin H. Bartoy, Endicott, NY (US); Michael L. Gregor, Endicott, NY (US); Michael J. Howland, Endicott, NY (US); Kenneth D. King, Vestal, NY (US); Paul E. Rogers, Johnson City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1718 days.

(21) Appl. No.: 12/116,557

(22) Filed: May 7, 2008

(65) Prior Publication Data

US 2009/0282409 A1 Nov. 12, 2009

(51) Int. Cl.
*G06Q 10/06* (2012.01)
(52) U.S. Cl.
CPC .......... *G06Q 10/06316* (2013.01); *G06Q 10/06* (2013.01)
(58) Field of Classification Search
USPC ............................................... 705/7.26, 7.27
See application file for complete search history.

(56) References Cited

U.S. PATENT DOCUMENTS

| | | |
|---|---|---|
| 6,334,178 B1 | 12/2001 | Cannon et al. |
| 6,721,879 B1 | 4/2004 | Tanaka |
| 6,782,537 B1 * | 8/2004 | Blackmore et al. ........... 719/313 |
| 6,785,706 B1 | 8/2004 | Horman |

(Continued)

FOREIGN PATENT DOCUMENTS

JP 2000053342 2/2000

OTHER PUBLICATIONS

Kim, Jaeho, Woojong Suh, and Heeseok Lee. "Document-based workflow modeling: a case-based reasoning approach." Expert systems with applications 23.2 (2002): 77-93.*

(Continued)

*Primary Examiner* — Jonathan G Sterrett
*Assistant Examiner* — Tzu-Hsiang Lan
(74) *Attorney, Agent, or Firm* — William A. Kinnaman, Esq.; Kevin P. Radigan, Esq.; Heslin Rothenberg Farley & Mesiti P.C.

(57) ABSTRACT

The invention resides in a method, system and program product for grouping related program sequences for performing a task. The method includes establishing, using a first code for grouping, one or more groups that can be formed between one or more related group-elements obtained from a plurality of groupable program flow documents, and executing, using a group program sequence engine, the groupable program flow documents, wherein each group-element considered an ancestor group-element of a group established and validated by the first code is executed before executing a related group-element obtained from the group, and wherein the related group-element of the group is executed only once during execution of the groupable program flow documents for performing the task. In an embodiment, the establishing step includes identifying a name attribute specified in the one or more related group-elements for establishing the one or more groups.

19 Claims, 12 Drawing Sheets

(56) References Cited

U.S. PATENT DOCUMENTS

| | | |
|---|---|---|
| 6,785,852 B2 | 8/2004 | Okamoto et al. |
| 7,234,140 B2 * | 6/2007 | Dortmans ............... 718/100 |
| 2003/0181991 A1 * | 9/2003 | Chau et al. ............... 700/1 |
| 2003/0217089 A1 * | 11/2003 | Bakow et al. ............ 709/100 |
| 2004/0019512 A1 * | 1/2004 | Nonaka ..................... 705/8 |
| 2006/0107265 A1 * | 5/2006 | Schulz et al. ............ 718/100 |
| 2009/0015860 A1 * | 1/2009 | Jahn et al. .............. 358/1.15 |
| 2009/0281777 A1 * | 11/2009 | Baeuerle et al. ........... 703/6 |

OTHER PUBLICATIONS

Madhusudan, Therani, J. Leon Zhao, and Byron Marshall. "A case-based reasoning framework for workflow model management." Data & Knowledge Engineering 50.1 (2004): 87-115.*

Bußler, Christoph, and Stefan Jablonski. "An approach to integrate workflow modeling and organization modeling in an enterprise." Enabling Technologies: Infrastructure for Collaborative Enterprises, 1994. Proceedings., Third Workshop on. IEEE, 1994.*

* cited by examiner

METHOD, SYSTEM AND PROGRAM PRODUCT FOR GROUPING RELATED PROGRAM SEQUENCES

FIELD OF THE INVENTION

The invention relates to computer systems and software, and more specifically to an automated technique for grouping related program sequences in a panel flow for performing a task, such as, a repair.

BACKGROUND OF THE INVENTION

Often businesses and/or organizations require repairs or replacements of equipment parts to be performed on site. One technique for performing a repair of a part on site is to guide a computer technician or customer engineer through the repair or replacement of an equipment part by presenting the computer technician or user or customer engineer with panels or screens that guide the technician or user through the repair of the part or parts. Accordingly, there is a need to ensure that panels employed for guiding a user through a repair of one or more parts are not unnecessarily repetitive and are effectively presented to the user during the repair.

SUMMARY OF THE INVENTION

The invention resides in a method, system and program product for grouping related sequences of program steps for performing a task. The method includes providing a plurality of groupable program flow documents to be executed by a group program sequence engine, establishing, using a first code for grouping, one or more groups that can be formed between one or more related group-elements obtained from the plurality of groupable program flow documents, and executing, using the group program sequence engine, the plurality of groupable program flow documents, wherein each group-element considered an ancestor group-element of a group established and validated by the first code is executed before executing a related group-element obtained from the group, and wherein the related group-element of the group is executed only once during execution of the plurality of groupable program flow documents for performing the task. In an embodiment, a sequence document references a series of panels and task states for performing a single task related to the task, and wherein a groupable program flow document includes a plurality of group-elements, where each group-element references an external sequence document. In an embodiment, the establishing step further includes identifying a name attribute specified in the one or more related group-elements for establishing the one or more groups. In an embodiment, the executing step further includes passing the plurality of groupable program flow documents to the group program sequence engine for execution. In an embodiment, the executing step further includes validating the one or more groups established before passing the plurality of groupable program flow documents to the group program sequence engine for execution. In an embodiment, the validating step further includes invoking a second code for validating the one or more groups established before passing the plurality of groupable program flow documents to the group program sequence engine for execution. In an embodiment, the group program sequence engine includes the first code, and wherein the second code is external to the group program sequence engine.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
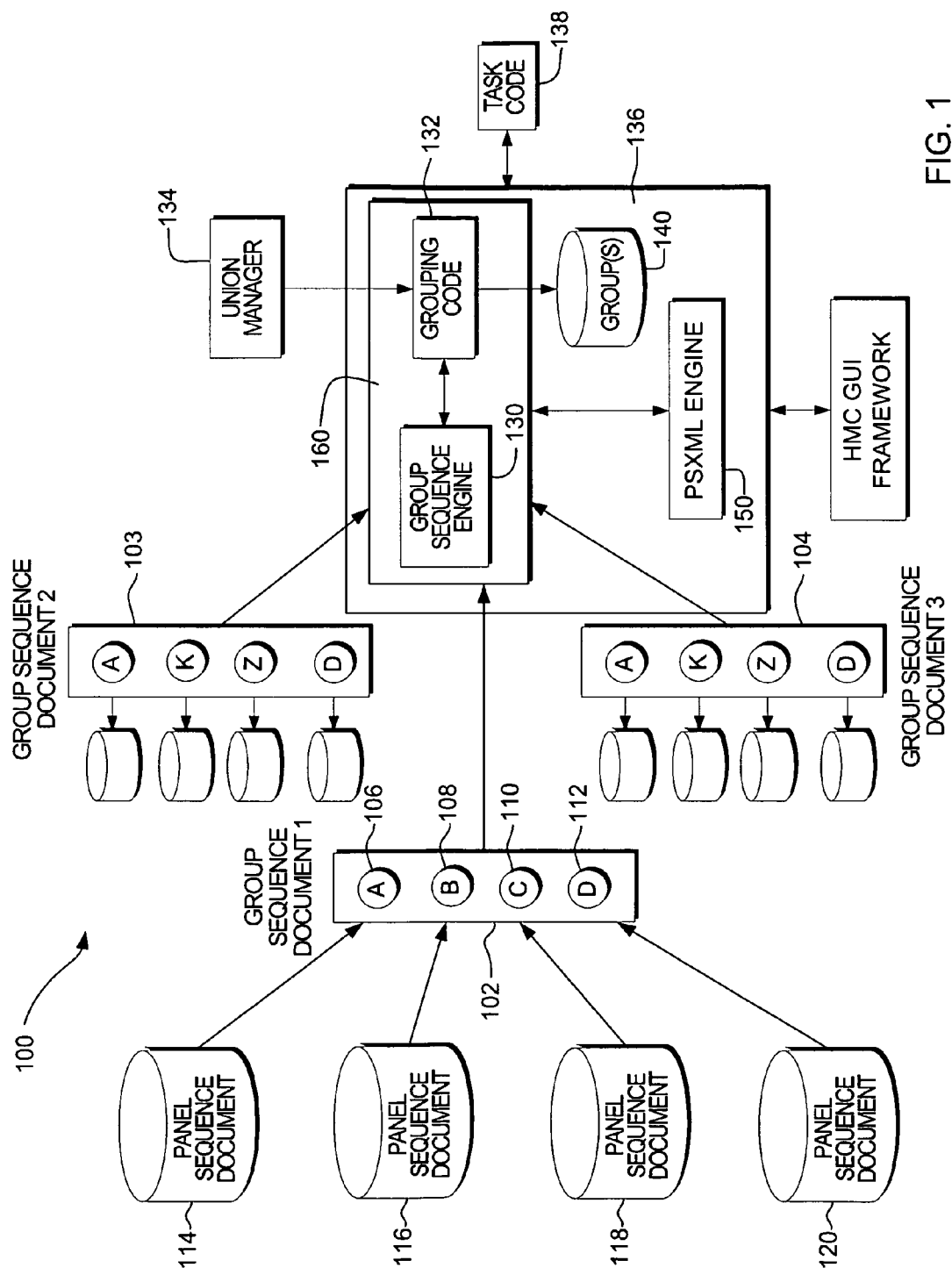
FIG. 1 is a schematic block system diagram illustrating an embodiment of a computer system having deployed thereon a group program sequence engine and a grouping tool or code for grouping related sequences in a plurality of groupable program flow documents or group sequence documents or program sequences for performing a task, in accordance with an embodiment of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. Reference will now be made in detail to the preferred embodiments of the invention.

In one embodiment, the invention provides a computer system for forming unions between related elements obtained from a plurality of groupable program flow documents or group sequence documents for performing a task, for instance, a guided repair, in accordance with an embodiment of the invention. Reference is now made to FIG. 1, reference numeral 100, which depicts a schematic block system diagram illustrating one embodiment of a computer system or infrastructure 100 comprising a standalone or personal computer or a server 136 that is coupled to a mainframe computer or system that has deployed thereon a commercially available application for managing and monitoring a mainframe computer or server, such as, the HMC (Hardware Management Console) application or program that is commercially available from International Business Machines Corporation (IBM). In an embodiment, the IBM® HMC (Hardware Management Console) application deployed on the computer system 136 uses its network connections to one or more servers to perform various management functions. The IBM® HMC (Hardware Management Console) program provides a standard user interface that enables a system administrator to manage configuration and operation of partitions in servers as well as to monitor the servers for hardware problems. Further, as shown in FIG. 1, the standalone or personal computer or a server 136 is executing a PSXML (Program Sequence Extensible Markup Language) engine 150, which in an embodiment, provides panel/program sequence control over panel and non-panel program flows for several users of the system 100. In an embodiment, the PSXML engine 150 is coupled to a computer system 160 that includes a group sequence engine or group program sequence engine or sequence engine 130, which processes, using the PSXML engine 150, one or more groupable program flow documents or group sequence documents 102, 103 and 104 in order to display panels to a customer engineer or user for performing a task, such as, a task, such that, panels displayed to the customer engineer or user help guide the user to perform a specific repair task on a computer system, such as, replacing a single Field Replaceable Unit (FRU). In an embodiment, a Field Replaceable Unit (FRU) is any part or unit that can be replaced, for example, a computer board or a memory chip, etc. Often a repair task may involve replacing multiple Field Replaceable Units (FRUs), where a user is guided through multiple panel flows or program steps to replace the multiple FRUs in a system. In an embodiment, replacement of a single FRU may involve presenting to a user, for instance, a customer engineer, a sequence of program steps in the form of panels and task states. In an embodiment, a sequence document or panel sequence document or program flow document comprises a single PSXML document that defines a series of panels and task states that are navigated through during execution of the sequence document. Further, a group sequence document comprises a single PSXML document that contains a series of <group-element> tags pointing to one or more sequence documents or panel sequence documents or program flow documents, where the tags are executed in the order provided to display the corresponding panels for accomplishing a given task, as discussed further herein below. Further, the group sequence engine 130 on computer system 160 includes a grouping code or tool or algorithm 132 for grouping one or more program steps or sequences that are common to one or more of the groupable program flow documents or group sequence documents, in this example, the three group sequence documents 102, 103, and 104. The group sequence engine 130 receives the groupable program flow documents or group sequence documents 102, 103, 104 and the grouping code 132 coupled to the group sequence engine 130 determines whether or not there are any common program steps or sequences within the group sequence documents 102, 103 and 104 received by the group sequence engine 130 that can be combined, so that any combined or grouped program sequence(s) or step(s) will only be executed once, thus, resulting in displaying the panel data for that step once, as discussed further herein below with respect to FIGS. 5-7. In addition, in an embodiment, the PSXML engine 150 processes the sequence documents that are obtained from the group sequence engine 130, after the grouping operations have been performed on 102, 103 and 104 by the group sequence engine 130, and where the PSXML engine 150 invokes a task code 138 for processing the group sequence documents 102, 103 and 104. Further, as shown in FIG. 1, the grouping tool or code 132 within the group sequence engine 130 utilizes a union manager code 134 for validating the common groups established before sending the established groups for execution to the PSXML engine 150. Further, as shown in FIG. 1, in an embodiment, the group(s) 140 or unions 140 of the common sequences that are formed are stored by the grouping tool or code 132 in a data storage within system 100. Further, as shown in FIG. 1, the group sequence document 102 comprises a series of group-elements that reference external panel sequence documents or program sequence documents. In particular, group sequence document 1 (reference numeral 102) comprises of group-elements 106, 108, 110 and 112. Further, each of the group-elements references (points to) an external panel sequence document or program sequence document or program flow document. For instance, group-element 106 references panel sequence document 114, group-element 108 references panel sequence document 116, group-element 110 references panel sequence document 118, and group-element 112 references panel sequence document 120.

Figure 2:
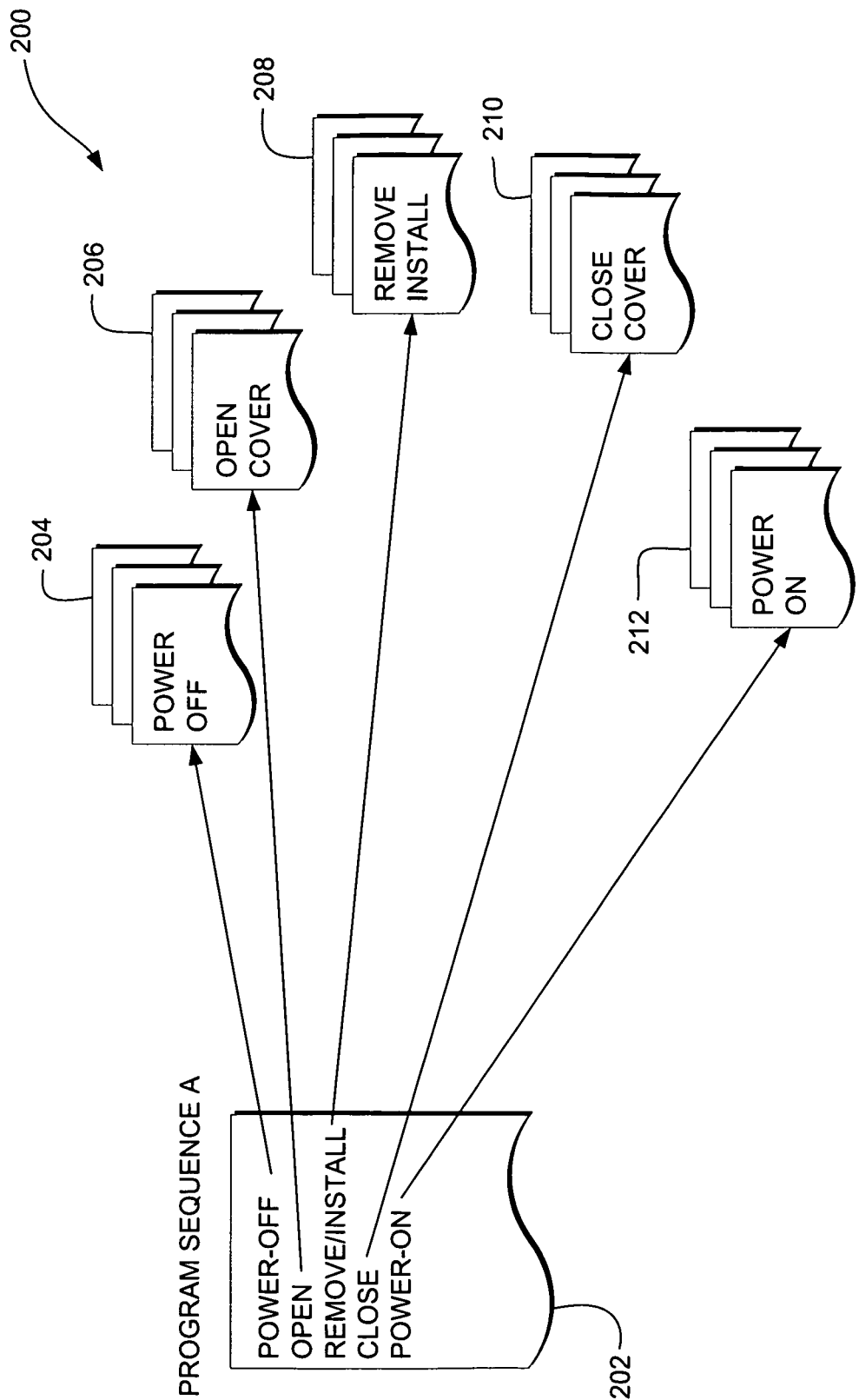
FIG. 2 is a schematic block diagram of a program sequence or panel sequence document defining a series of panels and task states to be navigated through during execution of the document, in accordance with an embodiment of the invention.

Reference is now made to FIGS. 2 through 7, which together illustrate how the grouping tool or code 132 within the group sequence engine 130 performs grouping of common program sequences or steps obtained from multiple groupable program flow documents or group sequence documents to be executed. Turning to FIG. 2, reference numeral 200 depicts a block diagram representing a program sequence document or sequence document or panel sequence document, in accordance with an embodiment of the invention. Referring to FIG. 2, a program sequence document or a sequence document 202 comprises a single PSXML document that defines a series of panels and task states (panel sequence documents) that are navigated through during its execution. In an embodiment, the panel sequence document comprises XHTML (Extensible Hyper Text Markup Language) documents that describe how the information should be presented to the user. For instance, as shown in reference numeral 200 of FIG. 2, a program sequence document A (reference numeral 202) points to a sequence of program steps (panels and/or task states in XHTML), such as, power off (reference numeral 204), open cover (reference numeral 206), remove install (reference numeral 208), close cover (reference numeral 210) and power on (reference numeral 212) that are navigated through during execution of the PSXML document 202. As depicted in FIG. 2, each of the program steps or sequences in a program sequence document 202 may comprise of one or more additional panels. For instance, as shown in FIG. 2, the "power off" sequence or step 204 may comprise of one or more program sequences 204. Similarly, the "open cover" sequence or step 206 may comprise of one or more program sequences 206, and the "remove install" sequence or step 208 may comprise of one or more program sequences 208, the "close cover" sequence or step 210 may comprise of one or more program sequences 210 and the "power on" sequence or step 212 may comprise of one or more program sequences 212. As such, a program sequence document 202 may refer to one or more additional sequence documents.

Figure 3A:
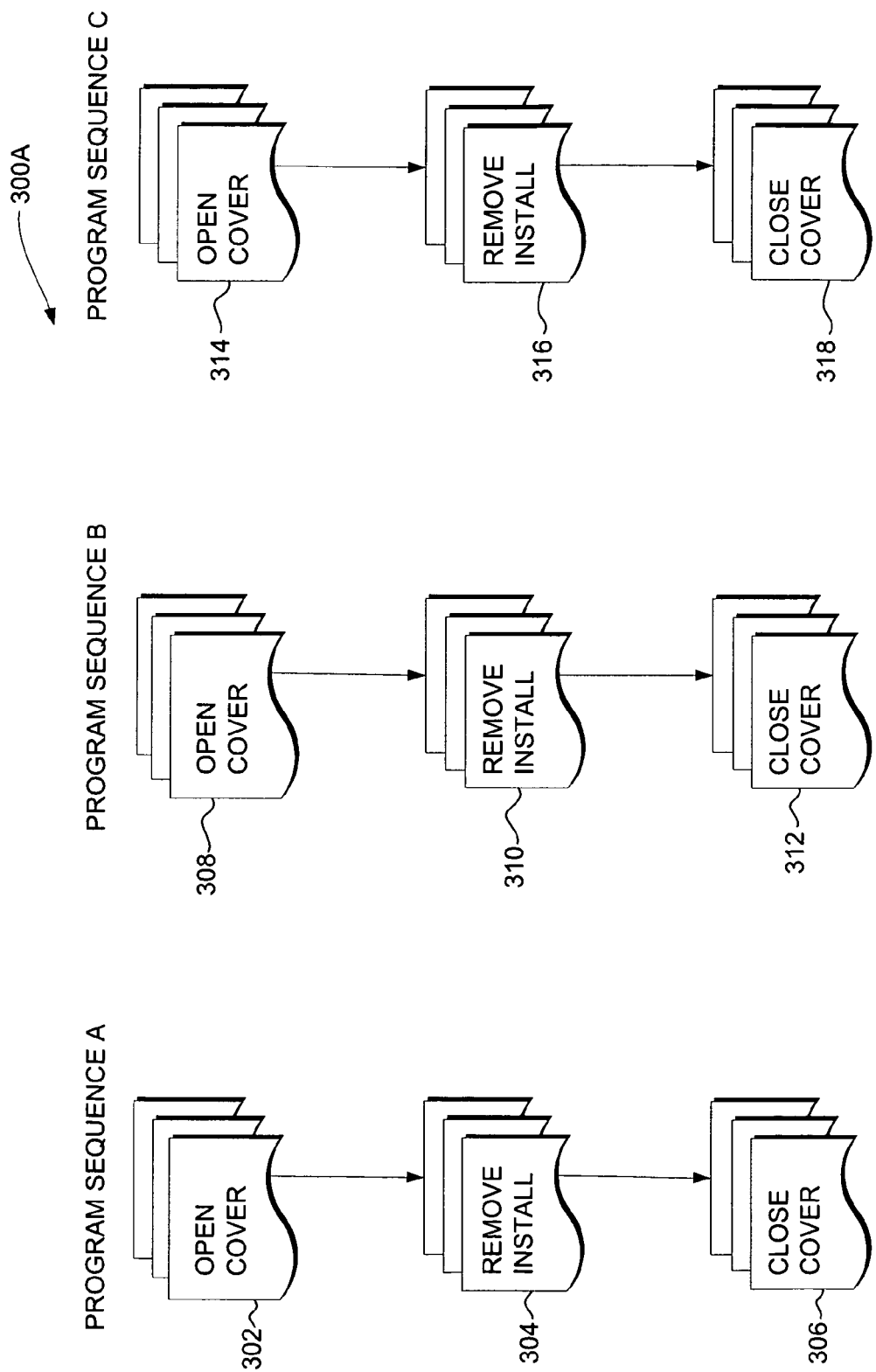
FIG. 3A depicts a block diagram of three separate program sequence documents that are presented to a user for performing a repair, in accordance with an embodiment of the invention.
Figure 3B:
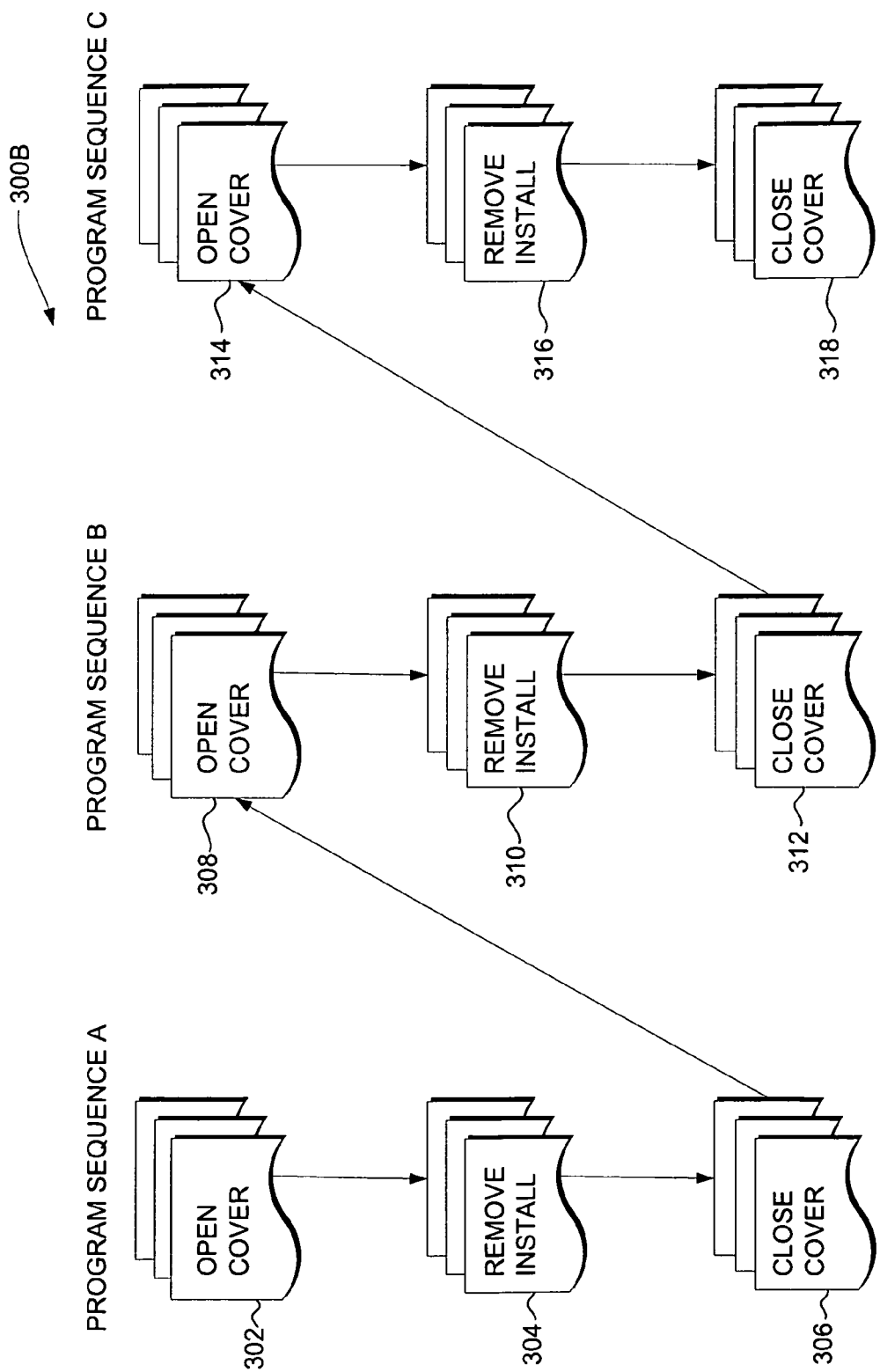
FIG. 3B depicts a block diagram showing an order of execution of the three separate program sequence documents shown in FIG. 3A that are presented in series to a user for performing a repair, in accordance with an embodiment of the invention.
Figure 3C:
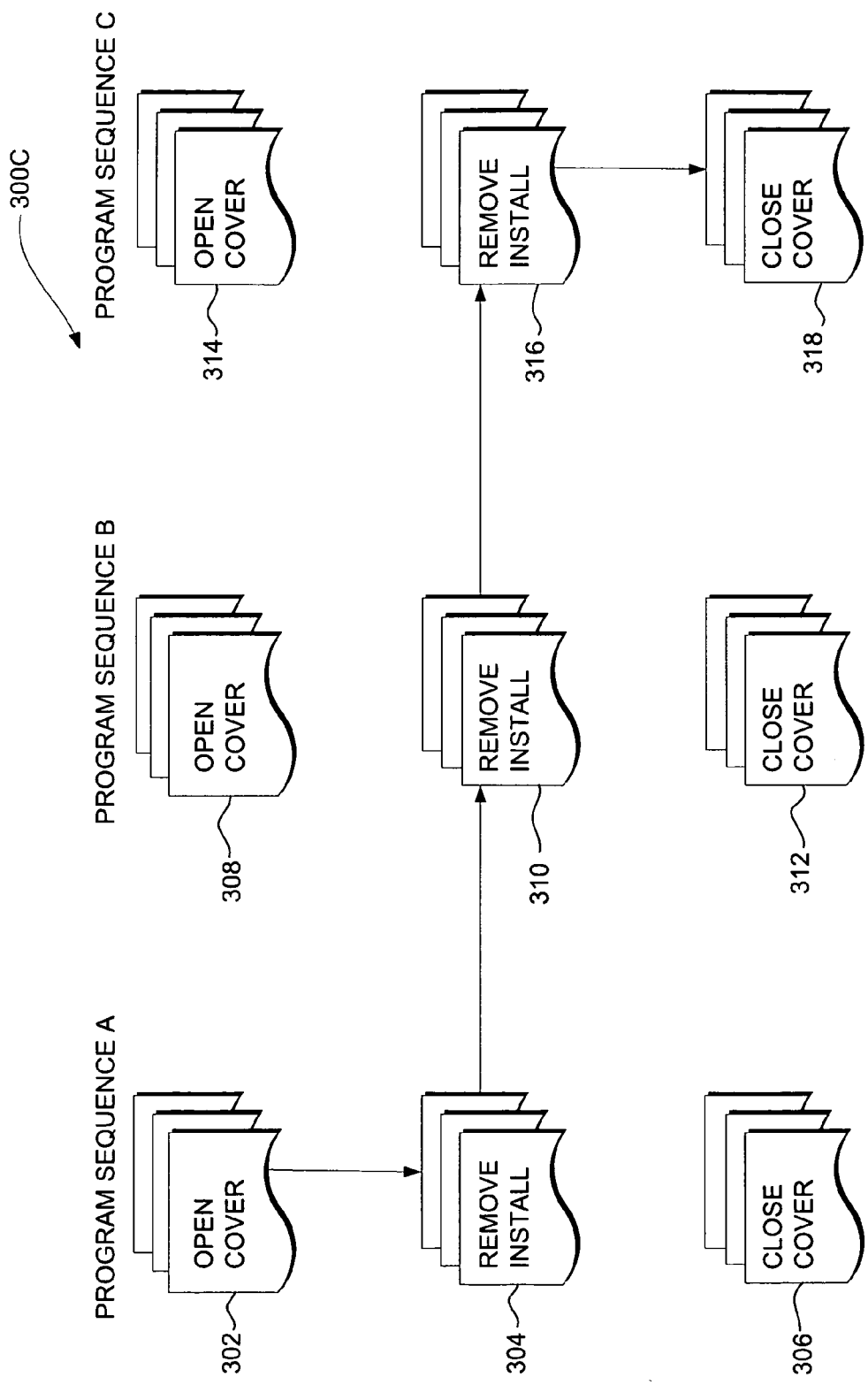
FIG. 3C depicts a block diagram showing an order of execution of the three separate program sequence documents shown in FIG. 3A after related group sequences have been grouped together and presented to the user for performing a repair, in accordance with an embodiment of the invention.

Reference is now made to FIGS. 3A through 3C, reference numerals 300A through 300C, which depict examples of three different program sequence documents A, B and C, where each program sequence document corresponds to replacing a single Field Replaceable Units (FRU). In particular, program sequence A comprises of sequences or steps presented as panels 302 ("open cover"), panels 304 ("remove install") and panels 306 ("close cover"), which steps are carried out or performed by a user (for instance, a customer engineer) in the order presented starting with panels 302, then panels 304 and ending with panels 306. Similarly, program sequence B comprises of sequences or steps presented as panels 308 ("open cover"), panels 310 ("remove install") and panels 312 ("close cover"), which steps are carried out or performed by a user (for instance, a customer engineer) in the order presented starting with panels 308, then panels 310 and ending with panels 312. Typically, as shown in FIG. 3B, reference numeral 300B, the customer engineer is presented with panels in the following order for performing a repair task involving replacing three Field Replaceable Units (FRUs) A, B and C corresponding to program sequences A, B and C: panels 302, panels 304, panels 306, panels 308, panels 310, panels 312, panels 314, panels 316 and panels 318. Although, the user or customer engineer may need to carry out the repair in the order shown in FIG. 3B, the user may be able to skip common steps, as shown in reference numeral 300C of FIG. 3C. Turning to FIG. 3C, given that steps 302, 308 and 314 are common to replacing each of the Field Replaceable Units corresponding to program sequence A, B and C, the user or customer engineer can simply open the cover once at the beginning of the repair and close the cover once during the end of the repair, as shown. In particular, as shown in FIG. 3C, the user would be presented with the following panels (in the order stated) for replacing the three FRUs, namely, panels 302, panels 304, panels 310, panels 316 and panels 318, such that, the user does not have to repeat certain steps or opening the cover and closing the cover when replacing each of the Field Replaceable Units A, B and C.

Figure 4:
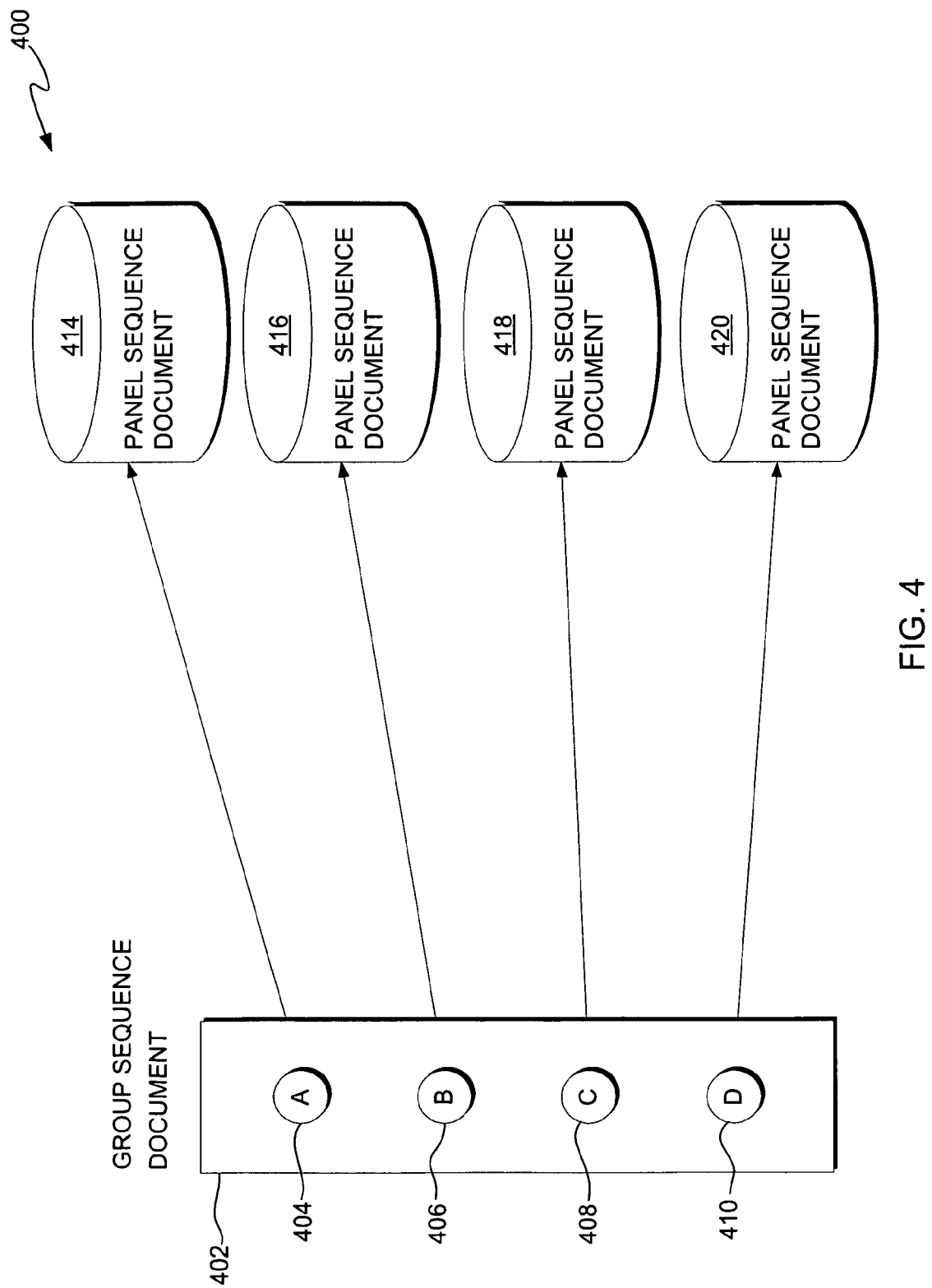
FIG. 4 depicts a block diagram of a group sequence document or groupable program flow document that contains a series of group-element tags that reference panel sequence documents, in accordance with an embodiment of the invention.

Reference is now made to FIG. 4, reference numeral 400, which shows a group sequence document 402. In an embodiment, a group sequence document 402 comprises a single PSXML document that contains a series of XML tags or <group-element> tags (also, referred to herein as group-elements) that are to be executed in the order provided to accomplish a given task or repair. Further, each group-element is a reference to a single PSXML sequence document (program sequence document or panel sequence document), as described herein above with respect to FIG. 2. Accordingly, the group sequence document 402 comprises of group-element A (reference numeral 404), group-element B (reference numeral 406), group-element C (reference numeral 408), and group-element D (reference numeral 410), where each of the group-elements are required to accomplish a given task or repair. Each respective group-element A through D in group sequence document 402 refers to a respective panel sequence document 414 through 420. In particular, group-element A 404 references panel sequence document 414, group-element B 406 references panel sequence document 416, group-element C 408 references panel sequence document 418 and group-element D 410 references panel sequence document 420. Accordingly, a group sequence document references a panel sequence document that comprises panels and other control steps required to accomplish a given task. For example, a single group sequence document may contain all the program steps required for a task of replacing a circuit board in a computer. These panels and control steps are divided into groups according to their name attributes and, as such, two or more group-elements may be grouped together if multiple groupable program flow documents or group sequence documents are processed by a group sequence engine, as described further herein below.

Figure 5:
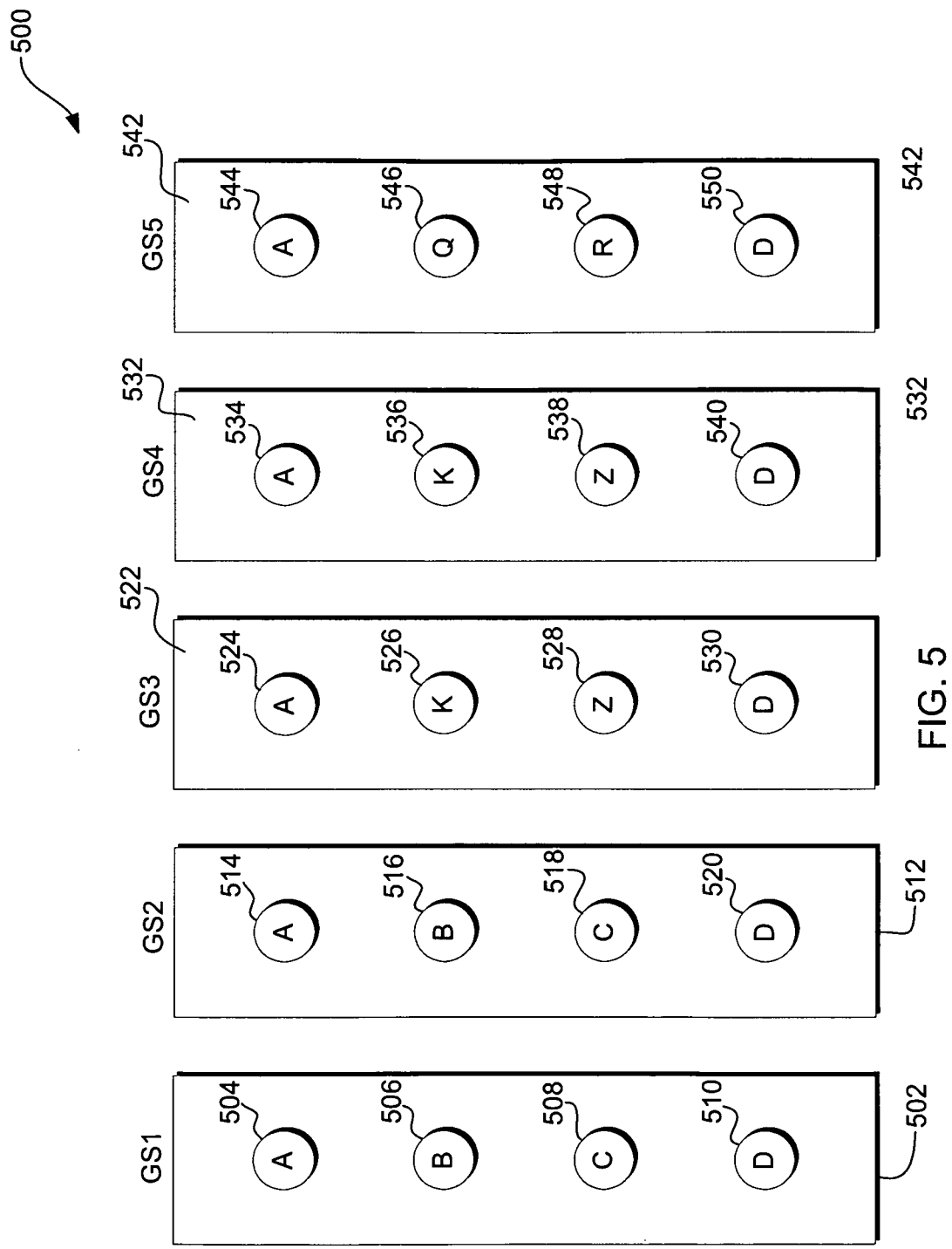
FIG. 5 depicts a block diagram of multiple groupable program flow documents or group sequence documents, each group sequence document containing a series of group-element tags that reference panel sequence documents, in accordance with an embodiment of the invention.

Turning to FIG. 5, reference numeral 500, depicts multiple group sequence (GS) documents 502, 512, 522, 532 and 542, referred to as GS1, GS2, GS3, GS4 and GS5, respectively. Group sequence document 502 (GS1) comprises of group-element A (reference numeral 504), group-element B (reference numeral 506), group-element C (reference numeral 508), and group-element D (reference numeral 510). Group sequence document 512 (GS2) comprises of group-element A (reference numeral 514), group-element B (reference numeral 516), group-element C (reference numeral 518), and group-element D (reference numeral 520). Group sequence document 522 (GS3) comprises of group-element A (reference numeral 524), group-element K (reference numeral 526), group-element Z (reference numeral 528), and group-element D (reference numeral 530). Group sequence document 532 (GS4) comprises of group-element A (reference numeral 534), group-element K (reference numeral 536), group-element Z (reference numeral 538), and group-element D (reference numeral 540). Group sequence document 542 (GS5) comprises of group-element A (reference numeral 544), group-element Q (reference numeral 546), group-element R (reference numeral 548), and group-element D (reference numeral 550). Again, as discussed herein above with respect to FIG. 3, each group sequence document represents all the panels required to accomplish a single given task. As such, some steps in each of the group sequence documents may be capable of being grouped together given that two or more tasks may have common steps, as discussed with respect to FIGS. 3A through 3C and discussed further herein below. For example, the first group-element A in each of the groupable program flow documents or group sequence documents 502, 512, 522, 532 and 542 may refer to an "open door" step, where a customer engineer or technician is guided to first open the door in order to perform a given task corresponding to each group sequence, whereas, a last group-element D in each of the groupable program flow documents or group sequence documents 502, 512, 522, 532 and 542 may refer to a "close door" step, where a customer engineer or technician is guided to close the door at the end of performing each task corresponding to a group sequence.

Figure 6:
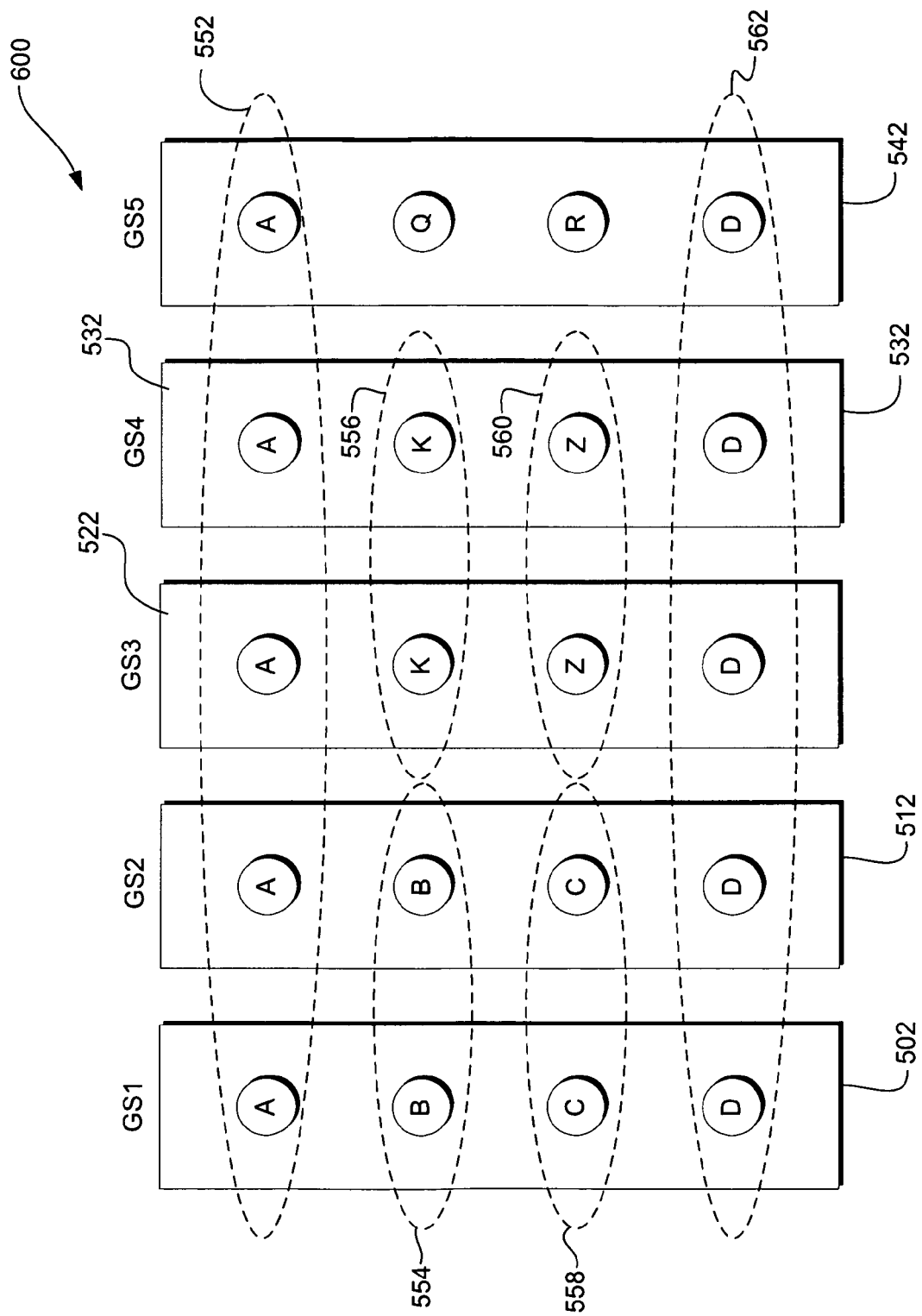
FIG. 6 depicts a block diagram of the multiple groupable program flow documents or group sequence documents shown in FIG. 5, where related group-elements are identified as candidates for grouping together, in accordance with an embodiment of the invention.

Turning to FIG. 6, reference numeral 600, depicts the five multiple group sequence (GS) documents 502, 512, 522, 532 and 542, shown in FIG. 5. In addition, FIG. 6 shows the identification, by the grouping tool or code, of candidate groups or unions that comprise of common program steps that can be combined and executed just once. The candidate grouping is done based on the name attribute specified in each of the groupable program flow documents or group sequence documents, as discussed herein above. As shown in FIG. 6, the group-element or program step A in each of the five group sequence documents GS1, GS2, GS3, GS4 and GS5 are identified as a candidate group 552 for grouping together program step A, such that, program step A may be executed just once. Further, program step B in group sequence documents GS1 and GS2 are identified as another candidate group 554 that may be executed just once and program step K in group sequence documents GS3 and GS4 are identified as another candidate group 556 that may be executed just once. Furthermore, program step C in group sequence documents GS1 and GS2 are identified as another candidate group 558 that may be executed just once and program step Z in group sequence documents GS3 and GS4 are identified as another candidate group 560 that may be executed just once. Finally, the group-element or program step D in each of the five groupable program flow documents or group sequence documents GS1, GS2, GS3, GS4 and GS5 are identified as a candidate group 562 for grouping together program step D, such that program step D may be executed just once.

Figure 7:
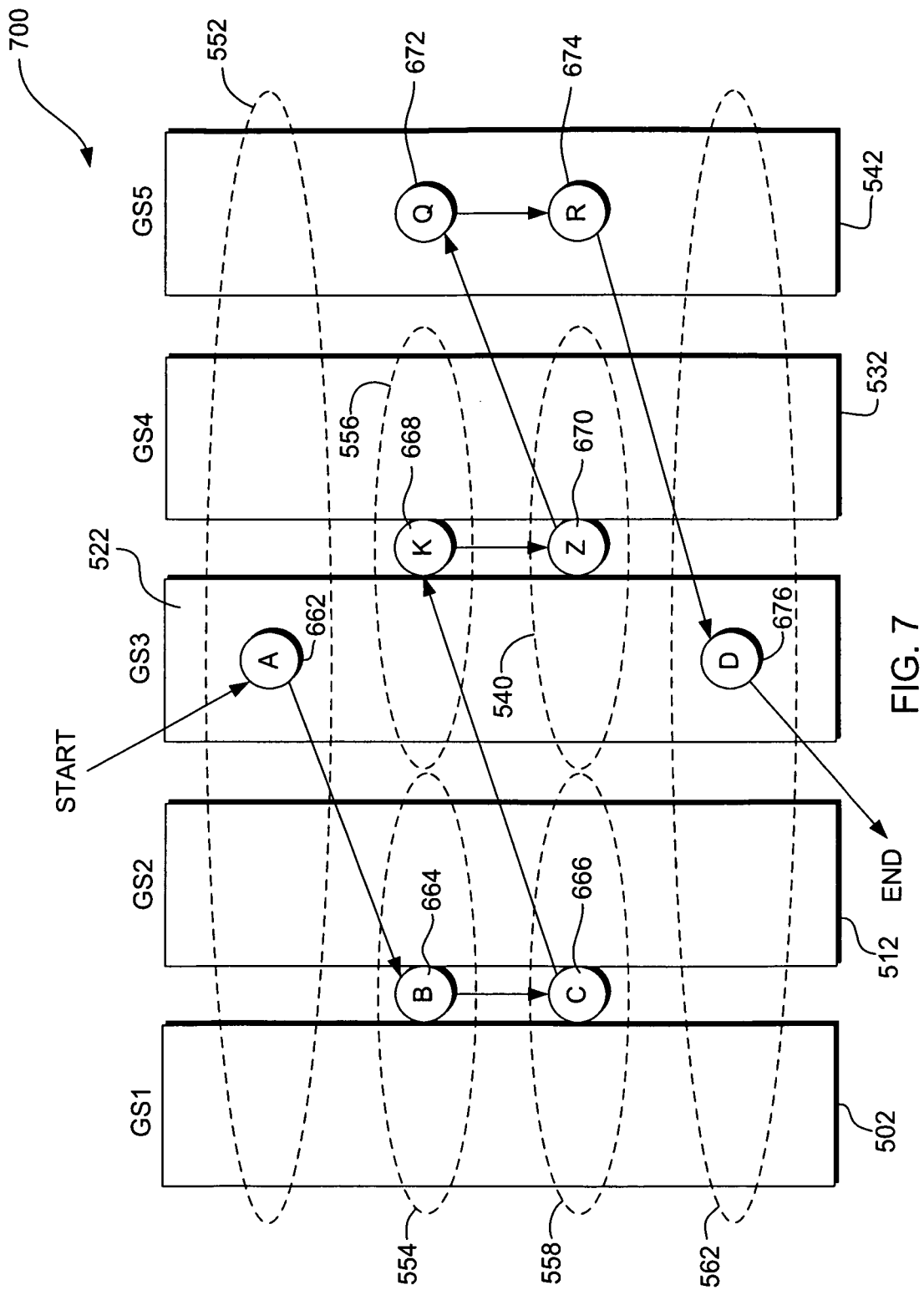
FIG. 7 depicts a block diagram of the multiple groupable program flow documents or group sequence documents shown in FIG. 6, and shows the execution path of the groupable program flow documents or group sequence documents, where related group-elements that have been grouped are executed only once, in accordance with an embodiment of the invention.

Turning to FIG. 7, reference numeral 700, depicts the five multiple group sequence (GS) documents 502, 512, 522, 532 and 542, shown in FIG. 6. In addition, FIG. 7 shows the order of execution of the program sequences by the grouping engine or group sequence engine, which includes execution of program sequences that have been grouped as well as execution of program sequences that have not been grouped by the grouping tool or code. In particular, the grouping engine or group sequence engine first executes the grouped sequence A (reference numeral 662) and then proceeds to the next grouped sequence B (reference numeral 664) obtained from the groupable program flow documents or group sequence documents GS1 and GS2. The group sequence engine then proceeds to the next grouped sequence C (reference numeral 666) obtained from the group sequence documents GS1 and GS2. Next, the group sequence engine executes the grouped sequence K (reference numeral 668) obtained from the group sequence documents GS3 and GS4 and then proceeds with the execution of the next grouped sequence Z (reference numeral 670) obtained from the group sequence documents GS3 and GS4. Next, the group sequence engine executes the group-element Q (reference numeral 672) in group sequence document GS5 and then proceeds to execute the next program step group-element R (reference numeral 674) in group sequence document GS5. The non-grouped group sequence documents, such as, Q, reference numeral 672 and R, reference numeral 674 are executed in series, as shown. The group sequence engine or group program sequence engine then proceeds with the execution of the last program step D (reference numeral 676) obtained from each of the group sequence documents GS1 through GS5. As mentioned herein above, the candidate grouping is done based on the name attribute specified in each of the group sequence documents. Further, in an embodiment, the group sequence engine invokes an appropriate task code or union manager (as shown in FIG. 1) to validate that the proposed grouping is acceptable before performing the execution of the grouped program sequences.

Figure 8:
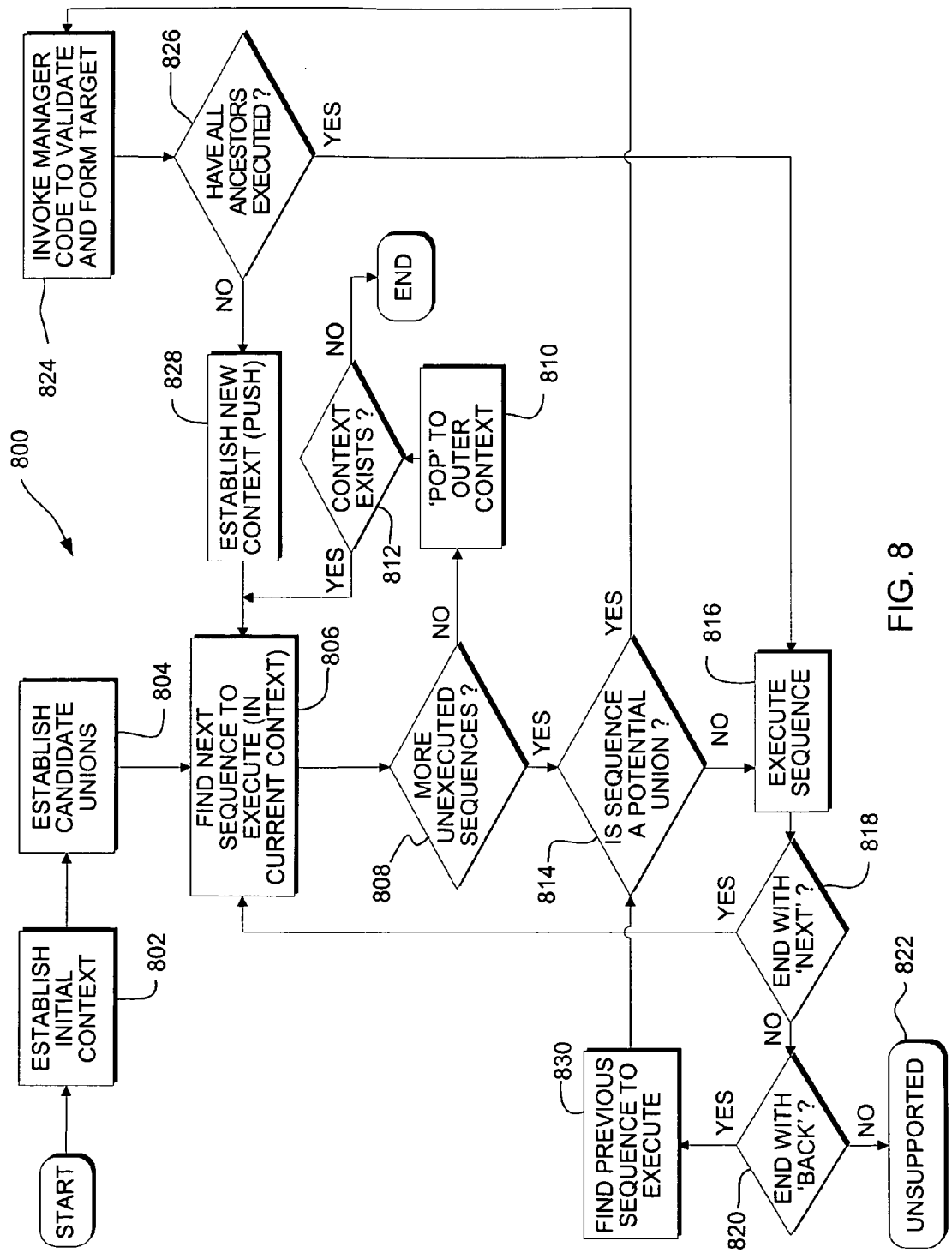
FIG. 8 depicts a flowchart outlining the steps performed by a grouping tool for grouping related sequences in multiple groupable program flow documents or group sequence documents for performing a repair, in accordance with an embodiment of the invention.

In another embodiment, as shown in FIG. 8, the invention provides a method 800 for grouping related or common sequences identified in a plurality of groupable program flow documents or group sequence documents for performing a task, for instance, a guided repair. Turning to FIG. 8, reference numeral 800 outlines the steps carried out by a grouping tool or code in conjunction with a group sequence program (discussed herein above) for grouping related sequences in a plurality of groupable program flow documents or group sequence documents for performing a task. The method begins with step 802 where the grouping tool or code establishes an initial context. For instance, the grouping tool or code may establish that there are five group sequence documents (as shown in FIG. 5) that need to be processed for a task or a guided repair. In step 804, the grouping tool or code establishes candidate unions or candidate groups among the five group sequence documents, as shown in FIG. 6. The grouping tool or code determines in step 806 the next sequence to execute in the current context established in step 802. In step 808, the grouping tool or code determines whether or not there are any unexecuted sequences. If there are unexecuted sequences found, then the grouping tool or code determines in step 814 whether or not there is a potential for a union or grouping among the unexecuted sequences. If the grouping tool or code determines that there are no potential groups or unions to be formed, then the grouping tool or code executes the sequence in step 816. However, going back to step 808, if the grouping tool or code determines that there are no unexecuted sequences, then the grouping tool or code moves to an outer context in step 810. The grouping tool or code determines if a context exists, if there is not context, the grouping tool or code ends processing. However, if there is a context, then the grouping tool or code goes back to step 806 and finds the next sequence to executed in the current context determined in step 812. Further, referring to step 814, if the grouping tool or code determines that the sequence is a potential union or group, then the grouping tool or code invokes in step 824 a task code, in particular, the union manager code, in order to validate and form a target or union or group. Further, in step 826, the grouping tool or code determines whether or not all ancestors have been executed. If all ancestors have not been executed, then the grouping tool or code establishes a new context and proceeds with step 806. However, in step 826, if all the ancestors have been executed, then the grouping tool or code proceeds with step 816 of executing the sequence. Further, the grouping tool or code determines in step 818, whether or not the sequence that was executed in step 816 ends with "Next" and, if yes, the grouping tool or code returns to step 806 to find the next sequence to execute. However, if in step 818 the grouping tool or code determines that the sequence that was executed in step 816 does not end with "Next", then the grouping tool or code determines whether or not the sequence that was executed in step 816 ends with "Back" and, if yes, the grouping tool or code finds in step 830 a previous sequence to execute and further continues with step 814 by making a determination in step 814 as to whether or not the sequence is a potential union. However, if the sequence that was executed in step 816 does not end with "Back", then the grouping tool or code ends at step 822, since the sequence is unsupported.

Figure 9:
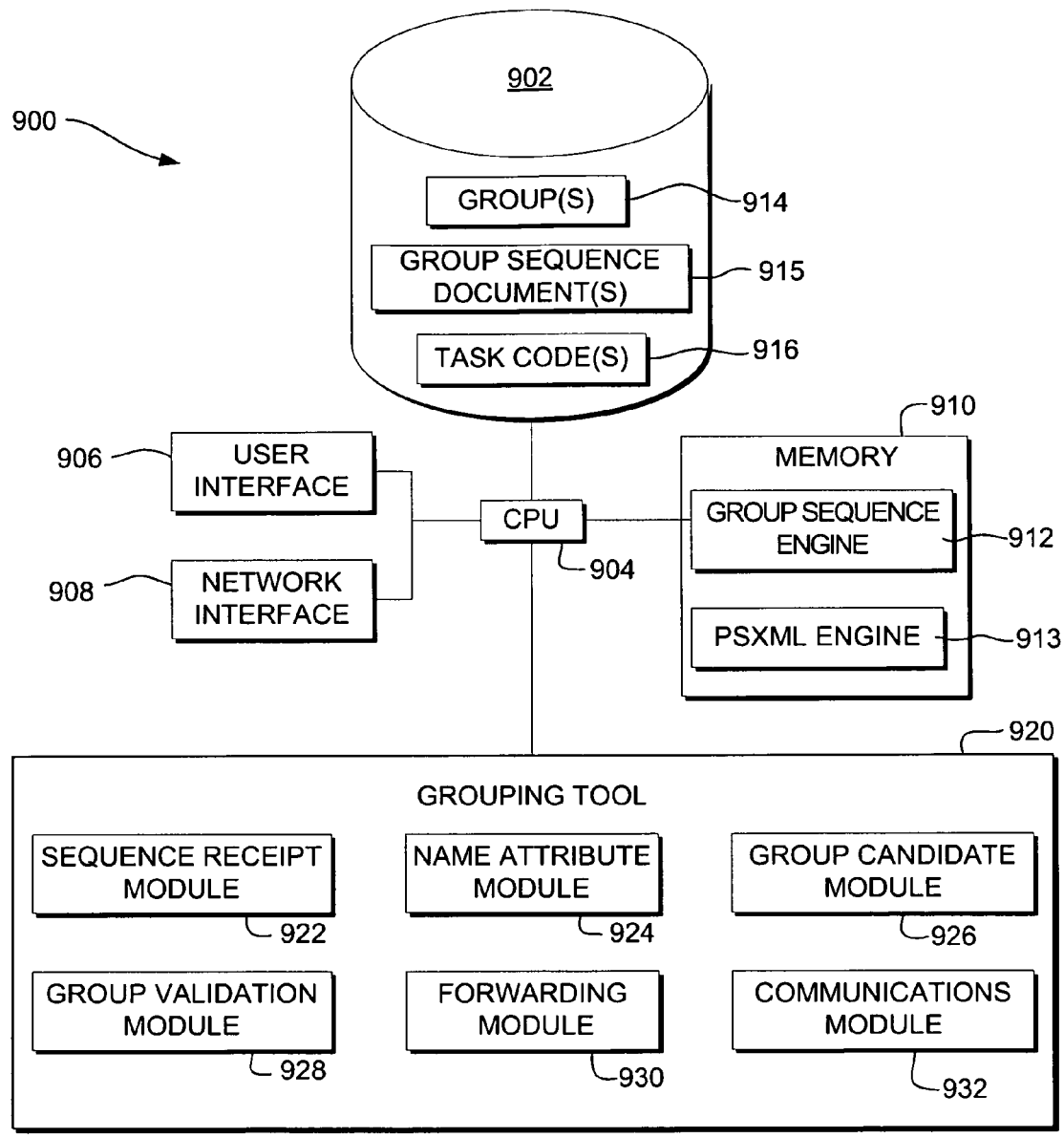
FIG. 9 is a schematic block system diagram illustrating an embodiment of a computer system having deployed thereon a group program sequence engine and a grouping tool or code for grouping related sequences in a plurality of groupable program flow documents or group sequence documents, in accordance with an embodiment of the invention.

In another embodiment, the invention provides a computer program product for forming unions between related elements obtained from a plurality of groupable program flow documents or group sequence documents for performing a task, such as, a guided repair, in accordance with an embodiment of the invention. In an embodiment, the computer program product comprises a computer readable storage medium that is loaded onto a computer system having a central processing unit and where the medium contains instructions for performing the steps of forming unions between related elements obtained from a plurality of groupable program flow documents. Turning to FIG. 9, reference numeral 900 depicts a schematic block system diagram illustrating one embodiment of a computer system 900, such as, a standalone computer or a laptop that has deployed thereon a group sequence engine or group program sequence engine 912 (shown in memory 910) and which has installed thereon a computer program product, namely, a grouping tool or code or algorithm 920 for forming unions between related elements obtained from multiple group sequence documents to be executed. In an embodiment, the computer system 900 comprises a PSXML (Program Sequence Extensible Markup Language) engine 913, which provides panel/program sequence control over panel and non-panel program flows presented to a user or computer engineer of the grouping system 900. In an embodiment, the group sequence engine 912 utilizes a grouping tool or program or code 920 deployed on the system 900 for forming unions between related elements obtained from multiple groupable program flow documents or group sequence documents passed on to the group sequence engine 912 for execution by the PSXML engine, as described herein above. Preferably, the system 900 is a computer system that includes a central processing unit (CPU) 904, a local storage device 902, a user interface 906, a network interface 908, and a memory 910. The CPU 904 is configured generally to execute operations within the system 900, such as, the group sequence engine 912 and the grouping tool or code 920. The user interface 906, in one embodiment, is configured to allow a user, such as, a computer engineer, to interact with the group sequence engine 912, including allowing input of data and commands from a user and communicating output data to the user. The network interface 908 is configured, in one embodiment, to facilitate network communications of the system 900 over a communications channel of a network (not shown in any of the drawings). In an embodiment, the local memory 910 is configured to store one or more applications or programs, such as, the PSXML engine 912 that receives the one or more group sequence documents 915 from the group sequence engine 912 running on the system 900. Further, the PSXML engine 912 is configured to process panel or program sequences, group sequence documents and non-panel program flows for a user of the computer system 900. Further, in an embodiment, unions or groups 914 that are formed and validated by the grouping tool 920 are stored within a storage system 902. Furthermore, in an embodiment, groupable program flow documents or group sequence documents 915 processed by the group sequence engine 912 in computer system 900 are stored in memory 910. Moreover, any task code(s) 916 used by the group sequence engine 912, to process the one or more group sequence documents 915 are stored in storage 902. Alternatively, the group(s) 914, the group sequence documents 915 and the task code(s) 916 may be stored in memory 910 or in a separate storage.

In one embodiment, as shown in FIG. 9, the grouping tool or program 920, which runs on the computer system 900 comprises a logic unit that contains a plurality of modules configured to functionally execute the necessary steps of grouping related sequences obtained from multiple groupable program flow documents or group sequence documents passed to the group sequence engine 912. In particular, the grouping code or tool 920 includes a sequence receipt module 922, a name attribute module 924, a group candidate module 926, a group validation module 928, a forwarding module 930 and a communication module 932. In an embodiment, the sequence receipt module 922 is configured to receive the one or more group sequence documents passed to the group sequence engine 912 for execution. The name attribute module 924 is configured to identify, among the multiple group sequence documents received, related group-elements that can be grouped together using a name attribute specified in a related group-element tag within the group sequence documents, as described herein above with respect to FIGS. 4-7. The group candidate module 926 is configured to identify program sequence candidates in the multiple group sequence documents that can be grouped together, as described herein above with respect to FIGS. 4-7. The group validation module 928 is configured to invoke a task code, such as, the union manager code or program for validating or sanctioning the candidate or proposed unions of program sequences. The forwarding module 930 is configured to forward, to the group sequence engine 912 for execution, the groupable program flow documents or group sequence documents having the established and validated groups or unions. The communications module 932 is configured to permit communication between the various modules of the grouping tool or code 920 and the other components, such as, the storage 902, which stores the group(s) 914 and the task code(s) 916.

Figure 10:
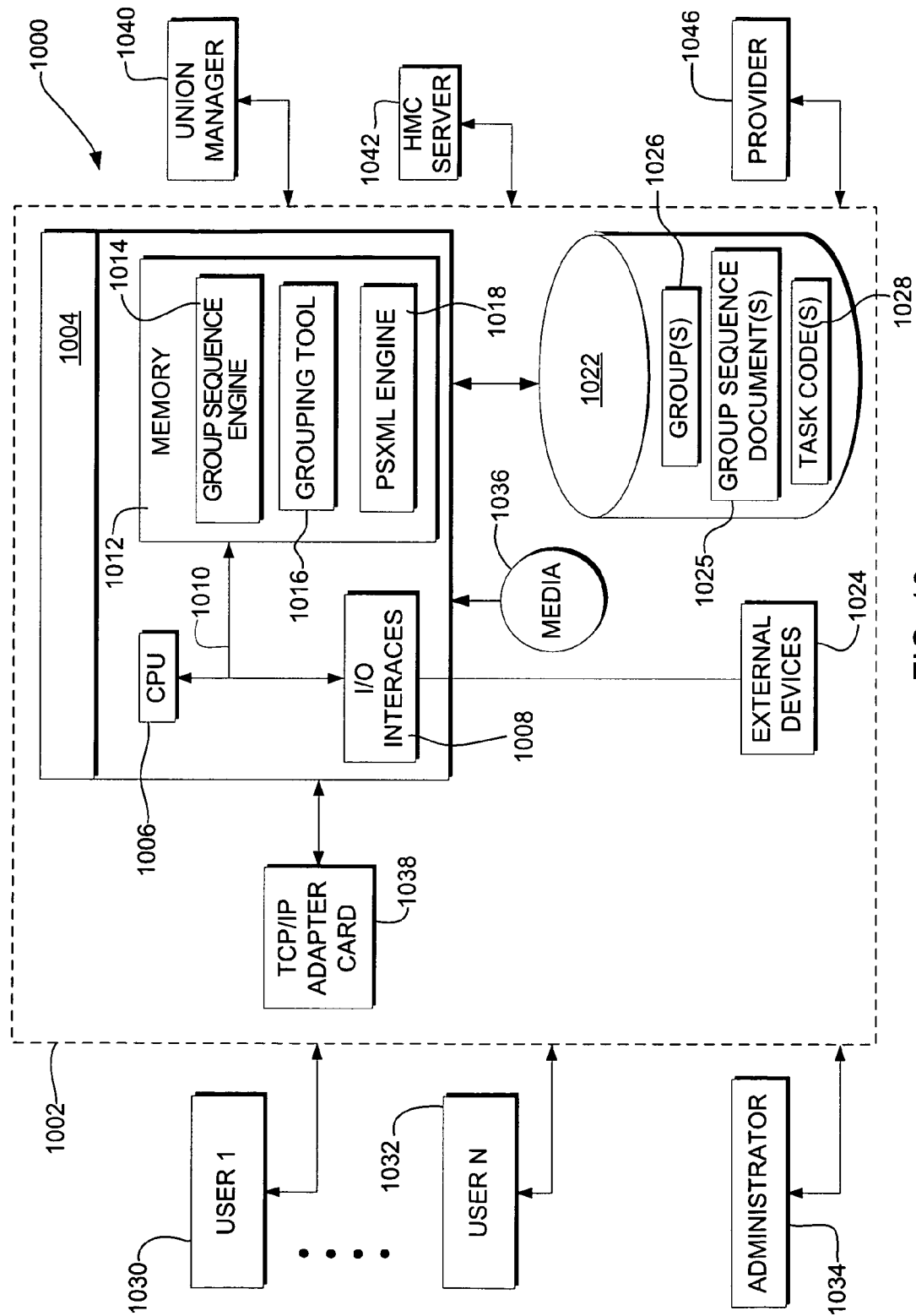
FIG. 10 is a schematic block system diagram of a computer infrastructure for grouping related sequences in multiple groupable program flow documents or group sequence documents, in accordance with an embodiment of the invention.

Referring now to FIG. 10, there is illustrated a computer infrastructure 1000 that includes a computer system 1002 having a computer program product, namely, the grouping tool or code 1016 that is configured to form unions between related elements obtained from multiple groupable program flow documents or group sequence documents, in accordance with an embodiment of the invention. The computer program product comprises a computer readable or computer-usable storage medium, which provides a program code, such as, the group sequence engine or group program sequence engine 1014, which includes a grouping tool or code 1016. The group sequence engine 1014 and/or the grouping tool or code 1016 can be loaded into computer system 1004 from a computer readable medium or media 1036, such as, a magnetic tape or disk, optical media, DVD, memory stick, semiconductor memory, etc. or downloaded from the Internet via a TCP/IP adapter card 1038. Further, as shown in FIG. 10, the computer system 1000 includes a PSXML engine 1018 that is configured to process the one or more group sequence documents 1025 from the group sequence engine 1014. As depicted in FIG. 10, system 1000 includes a computer infrastructure 1002, which is intended to represent any type of computer architecture that is maintained in a secure environment (i.e., for which access control is enforced). As shown, infrastructure 1002 includes a computer system 1004 that typically represents a standalone computer or an application server or system 1004 or the like that includes a group sequence engine 1014 and the grouping tool 1016 that is configured to form unions or groups between related elements obtained from multiple group sequence documents. It should be understood, however, that although not shown, other hardware and software components (e.g., additional computer systems, routers, firewalls, etc.) could be included in infrastructure 1002.

In general, one or more groupable program flow documents or group sequence documents 1025 (stored in a storage 1022) are passed on to the group sequence engine 1014 for processing or execution by the PSXML engine, such that, panels are presented to a user of the system, such as, a customer engineer for guiding the user through a repair, which may include replacing one or more Field Replaceable Units (FRUs). The grouping code or tool 1016 within computer system 1004 identifies or establishes related group-elements obtained from the multiple group sequence documents 1025 that can be grouped together and forms groups 1026 of these related group-elements. In an embodiment, the grouping tool 1016 validates the groups identified by contacting a task code 1028, referred to herein as the union manager code 1040, which in an embodiment, resides on a system external to the computer system 1004. Further, as shown, in an embodiment, the system 1002 is executing on an IBM® HMC (Hardware Management Console) application deployed on a server 1042, as described herein above.

As shown in FIG. 10, the computer system 1004 (which has implemented thereon the grouping code or tool 1016) is shown to include, in an embodiment, the group sequence document(s) 1025, the established group(s) or union(s) 1026 and task code(s) 1028 that are stored in a storage system 1022 within infrastructure 1002. In particular, a user, such as, a customer engineer (user 1, reference numeral 1030 through user N, reference numeral 1032) accesses the group sequence engine 1014 running on system 1004 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 1002 could occur via a direct hardwired connection (e.g., serial port), or via an addressable connection that may utilize any combination of wired line and/or wireless transmission methods. Moreover, conventional network connectivity, such as Token Ring, Ethernet, Wi-Fi (Wireless Fidelity) or other conventional communications standards could be used. Still yet, connectivity could be provided by conventional TCP/IP sockets-based protocol. In this instance, the parties could utilize an Internet service provider to establish connectivity to infrastructure 1002. It should be understood that under the invention, infrastructure 1002 could be owned and/or operated by a party such as a virtual provider 1046, or by an independent entity. Regardless, use of infrastructure 1002 and the teachings described herein could be offered to the parties on a subscription or fee-basis. In either scenario, an administrator 1034 could support and configure infrastructure 1002, for instance, upgrading the PSXML engine 1014 or the grouping tool or code 1016 deployed on the computer system 1004.

The computer system 1004 is shown to include a CPU (hereinafter "processing unit 1006"), a memory 1012, a bus 1010, and input/output (I/O) interfaces 1008. Further, the computer system 1004 is shown in communication with external I/O devices/resources 1024 and storage system 1022. In general, processing unit 1006 executes computer program code, such as, the PSXML engine 1014 and the grouping tool 1016. While executing computer program code, the processing unit 1006 can read and/or write data to/from memory 1012, storage system 1022, and/or I/O interfaces 1008. For instance, in one embodiment, the grouping tool 1016 within the group sequence engine 1014 stores the group(s) 1026 established for the groupable program flow documents or group sequence documents 1025 processed in storage 1022. Alternatively, the data stored in storage 1022 may be stored in a separate storage within the system 1004. Bus 1010 provides a communication link between each of the components in computer system 1000, such that information can be communicated within the infrastructure 1002. External devices 1024 can comprise any devices (e.g., keyboard, pointing device, display, etc.) that enable a user to interact with computer system 1000 and/or any devices (e.g., network card, modem, etc.) that enable server 1004 to communicate with one or more other computing devices.

Computer infrastructure 1002 is only illustrative of various types of computer infrastructures for implementing the invention. For example, in an embodiment shown, computer infrastructure 1002 comprises two or more computing devices (e.g., a server cluster) that communicate over a network to perform the various process steps of the invention. Moreover, computer system 1000 is only representative of various possible computer systems that can include numerous combinations of hardware. To this extent, in other embodiments, computer system 1000 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 1006 may comprise a single processing unit, or be distributed across one or more processing units in one or more locations, e.g., on a client and server. Similarly, memory 1012 and/or storage system 1022 can comprise any combination of various types of data storage and/or transmission media that reside at one or more physical locations. Further, I/O interfaces 1008 can comprise any system for exchanging information with one or more external devices 1024. Still further, it is understood that one or more additional components (e.g., system software, math co-processing unit, etc.) not shown in FIG. 10 can be included in computer system 1000. However, if computer system 1000 comprises a handheld device or the like, it is understood that one or more external devices 1024

(e.g., a display) and/or storage system(s) 1022 could be contained within computer system 1004, and not externally as shown. Storage system 1022 can be any type of system (e.g., a database) capable of providing storage for information under the invention, such as the files to be preprocessed by the brokering virtual advertisement tool 1016. To this extent, storage system 1022 could include one or more storage devices, such as a magnetic disk drive or an optical disk drive. In another embodiment, storage system 1022 includes data distributed across, for example, a local area network (LAN), wide area network (WAN) or a storage area network (SAN) (not shown). Although not shown, additional components, such as cache memory, communication systems, system software, etc., may be incorporated into computer system 1000.

Accordingly, the invention provides the ability to replace multiple FRUs (Field Replaceable Units) in one single procedure by combining sequences or steps into a single seamless program flow for related tasks, which avoids or reduces and/or eliminates the repetition of common steps or sequences by generating instructions that solve repairs that often result in duplication of tasks.

The foregoing descriptions of specific embodiments of the invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for grouping related program sequences in a plurality of groupable program flow documents for performing a task, said method comprising:
   providing a plurality of groupable program flow documents to be executed by a group program sequence engine;
   establishing, using a first code for grouping, a group that can be formed between multiple related group-elements obtained from multiple groupable program flow documents of said plurality of groupable program flow documents; and
   executing, using said group sequence engine, said plurality of groupable program flow documents for performing said task, wherein the executing the plurality of groupable program flow documents proceeds as a serially executed sequence of group-elements of the plurality of groupable program flow documents, and the executing comprises:
      establishing the group as a candidate union of the multiple related group-elements;
      subsequent to executing at least one group-element in the serially executed sequence of group-elements of the plurality of groupable program flow documents, reaching a point of execution of the serially executed sequence at which a single group-element of the multiple related group-elements is selected to be executed in the serially executed sequence, the point of execution reached in executing group-elements of one groupable program flow document of the plurality of groupable program flow documents;
      determining whether the single group element is part of a potential union of group-elements, wherein it is determined, based on the establishing the group as a candidate union, that the single group elements is part of a potential union of group-elements;
      based on determining that the single group-element is part of a potential union of group-elements, validating the candidate union to form a validated union of group-elements in which the single group-element of the multiple related group-elements is to execute rather than executing the multiple related group-elements;
      based on the validating, determining whether any related group-element of the multiple related group-elements has associated therewith an ancestor group-element that has not yet been executed as part of the serially executed sequence and that is to be executed before executing the single group-element, the ancestor group-element being an element of another groupable program flow document, of the plurality of groupable program flow documents, to which the related group-element belongs, and the ancestor group-element being outside of the group of multiple related group-elements, wherein it is determined that at least one related group-element of the multiple related group-elements has associated therewith at least one ancestor group-element that has not yet been executed as part of the serially executed sequence and that is to be executed before executing the single group-element;
      based on determining that the at least one related group-element has associated therewith at least one ancestor group-element that has not yet been executed as part of the serially executed sequence and that is to be executed before executing the single group-element, initiating execution of the at least one ancestor group-element associated with the at least one related group-element; and
      subsequently executing the single group-element, based on execution of the at least one ancestor group-element, wherein the single group-element of said group is executed only once during execution of said plurality of groupable program flow documents.

2. A method according to claim 1, wherein a groupable program flow document of said plurality of groupable program flow documents references a series of panels and task states for performing a single task related to said task, and wherein said groupable program flow document of said plurality of groupable program flow documents comprises a plurality of group-elements.

3. A method according to claim 2, wherein said establishing further comprises: identifying a name attribute specified in said multiple related group-elements for establishing said group.

4. A method according to claim 3, wherein said executing said plurality of groupable program flow documents further comprises: passing said plurality of groupable program flow documents to said group program sequence engine for execution.

5. A method according to claim 1, wherein said validating comprises: invoking a second code for validating said group.

6. A method according to claim 5, wherein said group program sequence engine comprises said first code, and wherein said second code is external to said group program sequence engine.

7. A computer system for grouping related program sequences in a plurality of groupable program flow documents for performing a task, said computer system comprising:
- a processor; and
- a memory in communications with the processor and storing program instruction to perform:
  - establishing a group that can be formed between multiple related group-elements obtained from multiple groupable program flow documents of a plurality of groupable program flow documents; and
  - executing said plurality of groupable program flow documents for performing said task, wherein the executing the plurality of groupable program flow documents proceeds as a serially executed sequence of group-elements of the plurality of groupable program flow documents, and the executing comprises:
    - establishing the group as a candidate union of the multiple related group-elements;
    - subsequent to executing at least one group-element in the serially executed sequence of group-elements of the plurality of groupable program flow documents, reaching a point of execution of the serially executed sequence at which a single group-element of the multiple related group-elements is selected to be executed in the serially executed sequence, the point of execution reached in executing group-elements of one groupable program flow document of the plurality of groupable program flow documents;
    - determining whether the single group element is part of a potential union of group-elements, wherein it is determined, based on the establishing the group as a candidate union, that the single group element is part of a potential union of group-elements;
    - based on determining that the single group-element is part of a potential union of group-elements, validating the candidate union to form a validated union of group-elements in which the single group-element of the multiple related group-elements is to execute rather than executing the multiple related group-elements;
    - based on the validating, determining, whether any related group-element of the multiple related group-elements has associated therewith an ancestor group-element that has not yet been executed as part of the serially executed sequence and that is to be executed before executing the single group-element, the ancestor group-element being an element of another groupable program flow document, of the plurality of groupable program flow documents, to which the related group-element belongs, and the ancestor group-element being outside of the group of multiple related group-elements, wherein it is determined that at least one related group-element of the multiple related group-elements has associated therewith at least one ancestor group-element that has not yet been executed as part of the serially executed sequence and that is to be executed before executing the single group-element;
    - based on determining that the at least one related group-element has associated therewith at least one ancestor group-element that has not yet been executed as part of the serially executed sequence and that is to be executed before executing the single group-element, initiating execution of the at least one ancestor group-element associated with the at least one related group-element; and
    - subsequently executing the single group-element, based on execution of the at least one ancestor group-element, wherein the single group-element of said group is executed only once during execution of said plurality of groupable program flow documents.

8. The computer system according to claim 7, wherein said establishing further comprises identify a name attribute specified in said multiple related group-elements for establishing said group.

9. The computer system according to claim 7, wherein said validating comprises invoking an external code for validating said group.

10. The computer system according to claim 9, wherein said executing said plurality of groupable program flow documents further comprises passing said plurality of groupable program flow documents to said group program sequence engine for execution.

11. The computer system according to claim 7, wherein a groupable program flow document of said plurality of groupable program flow documents comprises a plurality of group-elements, and wherein said groupable program flow document of said plurality of groupable program flow documents references a series of panels and task states for performing a single task related to said task.

12. A computer program product for grouping related program sequences in a plurality of groupable program flow documents for performing a task, said computer program product comprising:
- a non-transitory computer readable storage medium storing program instructions for execution to perform:
  - establishing a group that can be formed between multiple related group-elements obtained from multiple groupable program flow documents of a plurality of groupable program flow documents; and
  - executing said plurality of groupable program flow documents for performing said task, wherein the executing the plurality of groupable program flow documents proceeds as a serially executed sequence of group-elements of the plurality of groupable program flow documents, and the executing comprises:
    - establishing the group as a candidate union of the multiple related group-elements;
    - subsequent to executing at least one group-element in the serially executed sequence of group-elements of the plurality of groupable program flow documents, reaching a point of execution of the serially executed sequence at which a single group-element of the multiple related group-elements is selected to be executed in the serially executed sequence, the point of execution reached in executing group-elements of one groupable program flow documents of the plurality of groupable program flow documents;
    - determining whether the single group element is part of a potential union of group-elements, wherein it is determined, based on the establishing the group as a candidate union, that the single group element is part of a potential union of group-elements;
    - based on determining that the single group-element is part of a potential union of group-elements, validating the candidate union to form a validated union of group-elements in which the single group-element of the multiple related group-elements is to execute rather than executing the multiple related group-elements;

based on the validating, determining, whether any related group-element of the multiple related group-elements has associated therewith an ancestor group-element that has not yet been executed as part of the serially executed sequence and that is to be executed before executing the single group-element, the ancestor group-element being an element of another groupable program flow document, of the plurality of groupable program flow documents, to which the related group-element belongs, and the ancestor group-element being outside of the group of multiple related group-elements, wherein it is determined that at least one related group-element of the multiple related group-elements has associated therewith at least one ancestor group-element that has not yet been executed as part of the serially executed sequence and that is to be executed before executing the single group-element;

based on determining that the at least one related group-element has associated therewith at least one ancestor group-element that has not yet been executed as part of the serially executed sequence and that is to be executed before executing the single group-element, initiating execution of the at least one ancestor group-element associated with the at least one related group-elements; and subsequently executing the single group-element, based on execution of the at least one ancestor group-element, wherein the single group-element of said group is executed only once during execution of said plurality of groupable program flow documents.

13. The computer program product according to claim 12, wherein the estsblishing further comprises identifying a name attribute specified in said multiple related group-elements for establishing said group.

14. The computer program product according to claim 13, wherein a groupable program flow document of said plurality of groupable program flow documents comprises a plurality of group-elements, and wherein said groupable program flow document of said plurality of groupable program flow documents references a series of panels and task states for performing a single task related to said task.

15. The computer program product according to claim 12, wherein said validation comprises invoking an external code for validating the group.

16. The computer program product according to claim 15, wherein said executing said plurality of groupable program flow documents further comprises passing said plurality of groupable program flow documents to said group program sequence engine for execution.

17. The method of claim 1, wherein reaching the point of execution of the plurality of groupable program flow documents occurs in an outer context of the execution, and wherein executing the at least one ancestor group-element associated with the at least one related group-element comprises:

establishing an inner context of the execution of the plurality of groupable program flow documents, the inner context comprising a set of group-elements including the at least one ancestor group-element;

executing group-elements of the set of group-elements, wherein based on a group-element of the set of group-elements having one or more ancestor group-elements that have not yet been executed as part of the serially executed sequence and that are to be executed before executing the group-element of the set of group-elements, a further inner context is established for executing the one or more ancestor group-elements of the group-element of the set of group-elements;

based on completing execution of the group-elements of the set of group-elements, moving out of the inner context back to the outer context; and initiating the subsequent execution of the single group-element.

18. The computer system according to claim 7, wherein reaching the point of execution of the plurality of groupable program flow documents occurs in an outer context of the execution, and wherein executing the at least one ancestor group-element associated with the at least one related group-element comprises:

establishing an inner context of the execution of the plurality of groupable program flow documents, the inner context comprising a set of group-elements including the at least one ancestor group-element;

executing group-elements of the set of group-elements, wherein based on a group-element of the set of group-elements having one or more ancestor group-elements that have not yet been executed as part of the serially executed sequence and that are to be executed before executing the group-element of the set of group-elements, a further inner context is established for executing the one or more ancestor group-elements of the group-element of the set of group-elements;

based on completing execution of the group-elements of the set of group-elements, moving out of the inner context back to the outer context; and initiating the subsequent execution of the single group-element.

19. The computer program product according to claim 12, wherein reaching the point of execution of the plurality of groupable program flow documents occurs in an outer context of the execution, and wherein executing the at least one ancestor group-element associated with the at least one related group-element comprises:

establishing an inner context of the execution of the plurality of groupable program flow documents, the inner context comprising a set of group-elements including the at least one ancestor group-element;

executing group-elements of the set of group-elements, wherein based on a group-element of the set of group-elements having one or more ancestor group-elements that have not yet been executed as part of the serially executed sequence and that are to be executed before executing the group-element of the set of group-elements, a further inner context is established for executing the one or more ancestor group-elements of the group-element of the set of group-elements;

based on completing execution of the group-elements of the set of group-elements, moving out of the inner context back to the outer context; and initiating the subsequent execution of the single group-element.

* * * * *